United States Patent [19]

Falangas

[11] Patent Number: 5,645,260
[45] Date of Patent: Jul. 8, 1997

[54] ACTIVE PIEZO-ELECTRIC VIBRATION ISOLATION AND DIRECTIONAL BRACKET

[75] Inventor: Eric T. Falangas, Huntington Beach, Calif.

[73] Assignee: The Aerospace Corporation, El Segundo, Calif.

[21] Appl. No.: 441,263

[22] Filed: May 15, 1995

[51] Int. Cl.$^6$ .................................................. A01K 97/10
[52] U.S. Cl. ........................ 248/550; 248/562; 248/566; 248/638
[58] Field of Search ................... 248/550, 638, 248/618, 628, 566, 562; 310/328, 326, 330, 331, 340, 339, 316, 317

[56] References Cited

U.S. PATENT DOCUMENTS

| | | | |
|---|---|---|---|
| 2,941,579 | 6/1960 | Barker | 248/550 |
| 4,638,982 | 1/1987 | Misher et al. | 248/550 X |
| 4,645,169 | 2/1987 | Mischer | 248/550 |
| 4,735,296 | 4/1988 | Pinson | 248/550 X |
| 4,793,583 | 12/1988 | Bergacker et al. | 248/550 |
| 4,849,668 | 7/1989 | Crawley et al. | 310/328 |
| 4,883,248 | 11/1989 | Uchino et al. | 248/550 |
| 4,913,482 | 4/1990 | Hanai et al. | 248/550 X |
| 5,022,272 | 6/1991 | Bronowicki et al. | 73/772 |
| 5,176,355 | 1/1993 | Carter | 248/550 |
| 5,346,170 | 9/1994 | Schmidt | 248/550 |

OTHER PUBLICATIONS

Falangas, E. T., Dworak, J. A., Koshigoe, S., "Methods For Controlling Plate Vibrations Using PZT Actuators". AIAA Guidance Navigation and Control Conference, Aug. 1993 Monterey Cal.

Dworak, J.A., Falangas, E. T., Koshigo, S. Tseng, G.T., "Vibro–Acoustic Control Using PZT Actuators".

3rd International Conference on Adaptive Structures, November 1992 San Diego, Cal.

Doyle, J.C., Glover, K., Khargonekar, P.O., Francis, B.A., "State–Space Solutions to Standard H2 and H1 Control Problems" IEEE Trans. Automatic Control, vol. 34, No. 8, Aug. 1989.

Dailey, R. L. "Lecture Notes for the Workshop on H Infinity and u Methods For Robust Control" May 21, 1990 American Control Conference, San Diego, Cal.

Safanov, M.G., Limebeer, D.J.N., Chiang, R. Y. "Simplifying the H–Infinity Theory Via Loop–Shifting, Matrix Pencil and Descriptor Concepts" Int. Journal Control, vol. 50, No. 6, pp. 2467–2488, Apr. 1989.

Moore, B.C., "Principal Component Analysis in Linear Systems: Controllability Observability and Model Reduction" IEEE Trans. on Automatic Control, vol. Ac–26, No. 1 Feb. 1981.

Koshigoe, S., Murdock, J.W. "A Unified Analysis of Both Active and Passive Damping for a Plate with Piexoelectric Transducers" Journal Acoustical Society of America, vol. 93, No. 1, pp. 346–355, Jan. 1993.

Seidel, R. C. "Transfer Function Parameter Estimation From Frequency Response Data—A Fortran Program" NASA, Washington, DC Sep., 1975.

*Primary Examiner*—Carl D. Friedman
*Assistant Examiner*—Beth A. Aubrey
*Attorney, Agent, or Firm*—Derrick M. Reid

[57] ABSTRACT

Piezoelectric actuators bonded on S-shaped brackets extend between a support and a payload. The brackets can be used for vibration isolation by attenuating resonant vibrations under computer dynamic control relying on predetermined dynamic resonant characteristics and H-Infinity control methods. The brackets can also be used for platform directional pointing under computer control.

8 Claims, 9 Drawing Sheets

PAYLOAD-SUPPORT ISOLATION BRACKET

PAYLOAD-SUPPORT ISOLATION BRACKET

FIG. 1

BRACKET AND ACCELEROMETER LOCATIONS

DIRECTIONAL INPUTS TO PZT ACTUATION TRANSLATION

FIG. 4

DIRECTION AND VIBRATION CONTROL SYSTEM

FIG. 5

H-INFINITY CONTROL SYNTHESIS

FIG. 6A

H-INFINITY CONTROL SIMULATION

FIG. 6B

H-INFINITY CONTROL OPERATION

FIG. 6C

I/O FILTER SPECIFICATION

FIG. 7A

I/O FILTER H-INFINITY SYNTHESIS

FIG. 7B

I/O FILTER H-INFINITY OPERATION

FIG. 7C

ACTIVE PIEZO-ELECTRIC VIBRATION ISOLATION AND DIRECTIONAL BRACKET

STATEMENT OF GOVERNMENT INTEREST

This invention was made with Government support under contract number F04701-88-C-0089 awarded by the Department of the Air Force. The Government has certain rights in the invention.

SPECIFICATION

Reference to Related Application

The present application is related to applicant's co-pending patent application entitled Active Piezo-Electric Vibration Isolation and Direction Method, filed May 16, 1995, Ser. No. 08/442,518.

FIELD OF INVENTION

The present invention relates to vibration isolation directional systems. More particularly, the present invention relates to vibration isolation directional systems using piezoelectric actuators and control systems using H-Infinity control design methods.

BACKGROUND OF THE INVENTION

In space, there is a need for a system that can isolate a payload from spacecraft disturbances and vibrations such as those from launch, cryo-cooling and thermal expansion. Localized vibrations in launch vehicles have always been a problem. For example, Space Shuttle Solid Rocket Boosters generate a significant amount of vibrations. These vibrations are sensed by on-board gyros and accelerometers which are supposed to measure rigid body vehicular motion. The Space Shuttle, for example, has localized resonances on the boosters near instrumentation boxes used for flight control. These resonances were detected during vibration tests and were corrected by stiffening the compartment before the first flight. This prior method of stiffening structures, changes the frequency response and hence the resonance frequencies so that the vibrations frequencies would not interact with flight control systems which could cause flight control instability problems. One disadvantage of this approach is the necessary alteration of the flight structures, if at all practicable, which may be unique with each particular flight vehicle and for each payload.

Conventional vibration isolation systems are either passive or active systems. The passive systems use springs and dampers, such as rubber washers. The active systems use gimbals, motors, magnetic suspensions or proof-mass actuators. The active systems provide improved isolation over passive systems, but the active systems are higher in costs, heavy and bulky, and are not well suited for some space applications.

The vibration attenuation through active damping may be used to protect sensitive instruments from high vibrational loads. Active isolation systems using piezoelectric actuators (PZTs) bonded to vibrating plates have demonstrated vibration attenuation of high vibrations. The PZTs are bonded to the plate and electrically controlled to reduce plate vibrations.

PZTs are piezoelectric ceramic materials that can be distorted by the application of an electric field. The PZTs material is electrically poled during manufacture by the application of a large electric field annealed at high temperature. The application of an electric field along the polarization direction forces the PZTs to expand along the directions perpendicular to the electric field producing a local strain on the plate surface. If the electric field is opposite to the polarization direction, the PZTs will contract in the direction perpendicular to the electric field. This expansion or contraction of the PZTs bonded on the plate generate a local moment on the plate surface. During application as an actuator, the PZTs are operated below the depoling field which is approximately 750 volts/mm, for example at 150 V for a 2.0 by 5.0 cm square by 0.2 mm thick PZT bonded to, for example, a 0.5 meter by 0.6 meter by 1.0 mm thick aluminum plate.

The active PZT plate vibration system has PZTs bonded to a payload support platform plate upon which may also be secured the payload. The PZTs provide local moments on the plate. The PZTs are low in weight, volume and cost and respond to high frequency electric signals between 3 to 5 KHz. Hence, the PZTs may be bonded on a plate to remove vibrational energy of the plate so as to protect the payload. Accelerometers were located near the PZTs so that the system response between the co-located PZTs and accelerometers has a minimum-phase and is positive-real. This co-located system is easier to control than systems which are not co-located.

This co-located plate isolation system may use a variety of control methods, including for example, an H-Infinity design control method, or for another example, a rate feedback control method. The rate feedback control method is known to provide dampening over a large number of resonant frequencies, that is "modes", but without significant attenuation at any specific resonant frequency. The H-Infinity control method can be used to focus attenuation control at a few specific resonant frequencies but having a more complex control.

However, these prior plate co-located vibration isolating systems have failed to actively isolate sensitive instruments or experiments from disturbances coming from vibrating tables, floors, or vehicles. The plate can not isolate vibration originating from the struts and vehicular structures, even though localized vibrations on a plate may be reduced. PZT stacks may be adapted for directional attitude control, for example, for pointing space telescopes or antenna, and bonded PZTs have been adapted for plate vibration isolation. However, bonded PZTs used on plate vibrations isolation and PZT stacks used for directional control have limited performance and applications and have not been integrated into a single vibration isolation and directional control system. These and other disadvantages are solved or reduced using the present invention.

SUMMARY OF THE INVENTION

An object of the present invention is to isolate a suspended payload from a vibrating platform using a bracket connected therebetween.

Another object of the present invention is to isolate a suspended payload from a platform by the bracket having piezoelectric actuators attenuating platform vibrations.

Another object of the present invention is to provide a control system for attenuating vibration of a payload suspended on a vibrating platform by piezoelectric actuating brackets.

Yet another object of the present invention is to provide a method of developing a control system for attenuating vibrations of a payload suspended on a vibrating platform by piezoelectric actuating brackets.

Still another object of the present invention is to provide a low cost vibration isolation system that minimizes the transmission of mechanical vibrations from a vehicular platform from reaching a sensitive payload.

A further object of the present invention is an active isolation system which uses active brackets shaped in square "S" with bonded piezoelectric actuators.

Still a further object of the present invention is an active isolation system which uses active brackets shaped in square "S" with bonded vertical and horizontal piezoelectric actuators.

Yet a further object of the present invention is an active isolation system, which isolates sensitive instruments or experiments from disturbances occurring on a vibrating platform using suspension brackets with piezoelectric actuators and co-locate accelerometers for controlling vibrations in a plurality of degrees of freedom.

Still another object of the present invention is the controlling of localized vibrations in launch vehicles during boost by attenuating localized resonances.

Another object of the present invention to provide a directional control system for pointing a payload relative a support using piezoelectric brackets.

Another object of the present invention is to provide an integrated vibration isolation and directional control system using piezoelectric brackets.

The development of vibration isolation systems is motivated by efforts to minimize the effects of disturbances on instruments, particularly those inside outer space launch vehicles. The present invention uses active brackets preferably shaped like a square letter "S," called S-brackets which suspend a payload from a supporting platform. Piezoelectric actuators (PZTs) are bonded on the surfaces of the bracket. The PZTs enable slight deformation of the S-bracket by the application of a voltage to the PZTs to counteract the effect of vibrations. Vibration control is achieved by this slight deformation of the S-bracket by the voltages applied in a direction to counteract the motion induced on the payload due to vibration of the supporting platform. At high frequencies, the S-brackets behave like regular springs, passively attenuating high frequency vibrations from reaching the sensitive payload instrument. The PZTs are inexpensive as compared with precision motors, magnetic bearings and other type of actuators used for active vibration control. The S-bracket is highly reliable because it requires no bearings that can fail, nor requires complex electromagnetic controls such as those in magnetic suspension systems.

In space the S-brackets are used for isolating a payload from mechanical spacecraft disturbances such as those generated from cryo-cooling device and launch. Particularly, the S-brackets are used for isolating noisy devices from sensitive spacecraft instruments. The isolation system can use a dummy box to simulate a generic type of payload to be used on a space vehicle for pre-launch testing. In the preferred form of the invention, the payload is mounted to the flexible plate supporting platform by means of the S-brackets. The S-brackets are made of thin metal strips of aluminum which are bent and shaped like a square letter "S". Several S-brackets, for example six S-brackets, are used to suspend the payload away from the vibrating support platform. Active control of each S-bracket is obtained by several pairs of PZTs, for example, three pairs of PZTs, bonded on portions of the S-bracket surface for generating pure local moments. The two PZTs of each pair are bonded on opposite sides of the strip thereby sandwiching the S-bracket. The metal part of the S-bracket is connected to ground. The other two sides of the PZTs, of each pair, are connected to a voltage source. Each PZT pair is connected to the same voltage source which is the output of a high gain PZT amplifier. Polarization of each PZT pair is in the same direction, that is, one PZT has polarization direction towards the S-bracket and the other one has polarization away from the S-bracket. This preferred interconnection produces a pure local moment on the bracket because one PZT expands as the other contracts on opposite sides of the strip of the bracket. The voltage amplitudes applied to the PZTs are well below the polarization voltages, typically not exceeding 150 volts. The local moment is also proportional to the applied voltages which are used to control the local bending of the S-bracket.

The isolation system provides vibration isolation along multiple degrees of freedom, for example six, that is, yaw, pitch, roll, X, Y and Z. The system uses a programmed computer to sense motion of the payload and to provide control signals to the PZTs. H-Infinity synthesis is used to generate functional computer control. The vibration transfer function between the supporting platform and the payload is measured and curve fitted to a mathematical transfer function equation which is then reduced to state-space representation for H-Infinity synthesis. An H-Infinity synthesis model is produced consisting of a state space model and design parameters which define performance criteria. Selected resonant frequencies, i.e., selected modes, are low frequency resonances and are represented in the performance criteria as an output of the H-Infinity model. Resonances to be attenuated are selected as attenuation mode as an output criteria to an H-Infinity model. The H-Infinity model is truncated for reduced computational requirement. The H-Infinity model also has low and high frequency filtered loop shaping to define the control bandwidth. The resulting H-Infinity controller is then digitized for operation use. An H-Infinity control function is coded and programmed into a controlling computer. During operation, the computer senses the payload motion using co-located accelerometers, A/D converters and provides control signal to the PZTs using D/A converters and low pass filters, to actuate the PZTs to attenuate the low frequency selected resonant modes.

The system can provide attenuation both at low and high frequencies. The vibration tests have shown that the present invention can reduce more than a factor of ten attenuation of the first six resonant frequency modes. The S-bracket will naturally attenuate high frequency disturbances above three hundred hertz because the bracket functions like a passive spring at high frequencies. Lower frequency disturbances between five and one hundred hertz, occurring within the first few resonances are actively attenuated by the isolation system. The frequencies of actively controlled resonances can be much higher, e.g. two kilo hertz, because the PZTs can respond to frequencies up to five kilo hertz. In another aspect of the invention the S-brackets are used for directional controls for applying small angles, for example, two degrees, for low bandwidth precision pointing of a suspended payload. In yet another aspect of the present invention the directional controls are superimposed with the vibration isolation controls as an integrated system providing directional control and vibration isolation using superimposed electrical control signals actuating the PZTs. High frequency accelerometers are used for closed loop vibration isolation control and low frequency gyros are used for closed loop directional control in the integrated system. These and other advantages will become more apparent from the following detailed description of the preferred embodiment.

DETAILED DESCRIPTION OF THE PREFERRED EMBODIMENT

Figure 1:
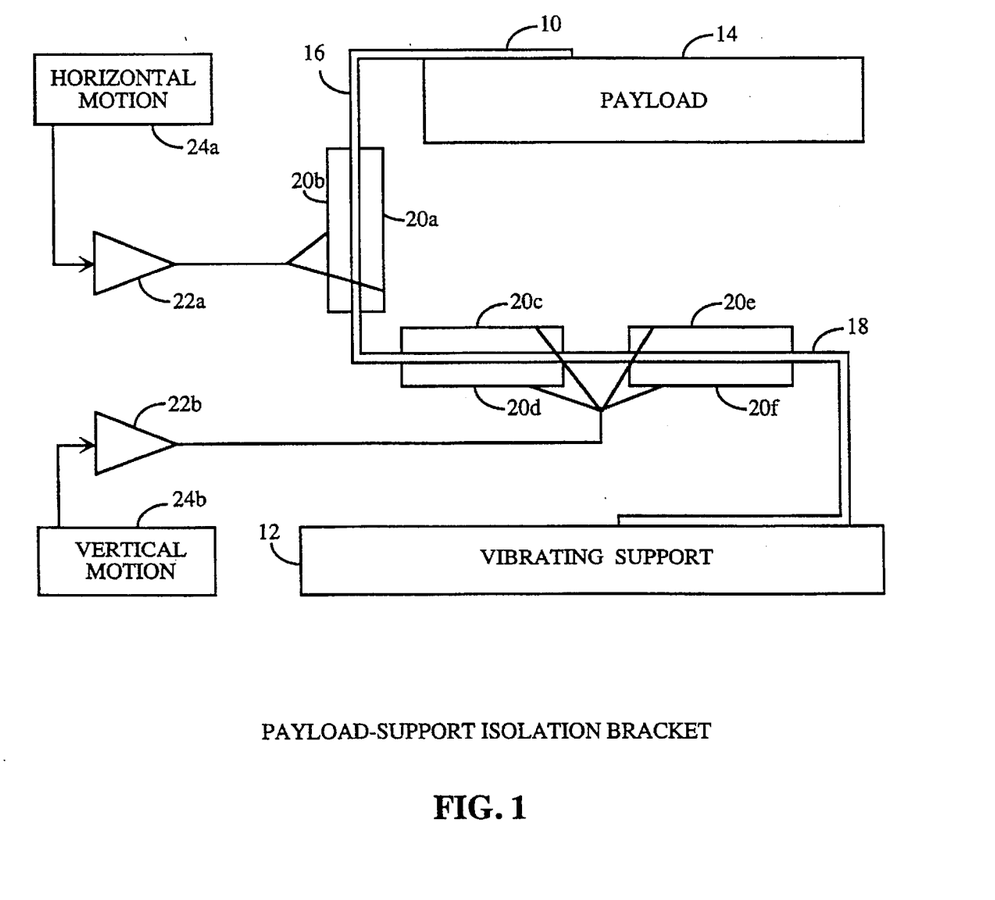
FIG. 1 is a block diagram of an "S" bracket having bonded piezoelectric actuators and mounted between a vibrating support and a payload.

Referring to FIG. 1, a metal S-bracket 10 is mounted to a vibration supporting platform 12 to suspend a payload 14 from the support 12. The S-bracket 10 is preferably made of Aluminum. The bracket 10 is preferably about 1.2 millimeters thick. The S-bracket 10 is preferably made of a thin metal strip bent in the shape of a square letter "S," as shown. The bracket 10 is preferably "S" shaped having a vertical portion 16 and horizontal portion 18 upon which are bonded piezoelectric actuators (PZTs) 20a–f. The vertical PZTs 20a–b are driven by horizontal motion amplifiers 22a under horizontal motion controls 24a and horizontal PZTs 20c–f are driven by vertical motion amplifiers 22a under vertical motion control 24b.

The S-bracket 10 acts like a suspension spring having natural low frequency resonances. The motion controls 24a and 24b function to control the PZTs 20 to attenuate the peak resonance responses by active dampening through electronic control to minimize peak vibrations from the support 12 to payload 14. Low frequency disturbances occurring within the first few resonant frequencies, that is "modes", can be attenuated by active control. The S-bracket 10 actively isolates vibrations at low frequency resonant modes and passively attenuates vibrations at high frequency resonant modes.

The S-bracket 10 can be deformed by an amount proportional to the input voltage of amplifiers 22a and 22b and to respond at frequencies up to five kilo Hertz which enables the bracket 10 function as an active element for vibration attenuation and control. The S-bracket 10 will naturally attenuate high frequency disturbances because the bracket 10 behaves like a passive spring at high frequencies. Active control is provided by the strain energy of PZTs 20 bonded with conductive adhesive, not shown, on the aluminum strip of the bracket 10. The PZTs 20 are plated with a plate, not shown, of conductive material on the exterior surfaces to which are connected the amplifiers 22. One side of each PZT is bonded to the S-bracket and the other side is connected to the amplifiers 22. The amplifiers 22 are connected to the plated PZTs to provide the PZTs with electric voltage signals for active actuation. Identical pairs of PZTs 20 are bonded on either side of the portion 16 or 18 of the surface of the bracket 10 generating local moments under electrical control of the amplifiers 22. The PZTs 20 are bonded on two opposite sides of the strip of the S-bracket 10, thereby sandwiching the vertical portions 16 and horizontal portions 18 of the S-bracket 10. The metallic S-bracket is electrically connected to ground while the PZTs are electrically actuated by the amplifiers 22. Two sides of PZT pairs 20a–b, 22c–d, and 22e–f, that are not bonded to the bracket 10 are connected together to the voltage source PZT amplifiers 22a or 22b, as shown. The polarization of each PZT pair 20a–b, 20c–d, and 20e–f is in the same direction, one PZT 20b, 20d, or 20f has the polarization direction towards the bracket 10 and the other PZT 20a, 20c or 20e, respectively, has the polarization direction away from the bracket 10. This combination produces a pure local moment on the bracket 10. The amplifiers 22a and 22b cause one PZT 20a, 20c or 20d to stretch while the other identical PZT 20b, 20e or 20f on the opposite side of the bracket 10 to contract when a constant dc voltage is applied at the input of the PZT amplifiers 22 or 22b. When the voltage amplitudes applied to the PZTs 20 are well below the polarization voltages, typically not exceeding 150 volts, the local moment is linearly proportional to the applied voltage from the amplifiers 22a and 22b.

The bracket 10 will naturally attenuate high frequencies resonances, but the PZTs provide active dampening. By varying the local moment on the horizontal portion 18 or vertical portion 16 of the bracket 10 by controlling the PZTs 20, the resonant frequencies are dampened resulting in reduced effects of vibration excitation from the support. PZT actuation does not significantly change the natural frequencies of the brackets system, but rather dampened the vibrations.

Figure 2:
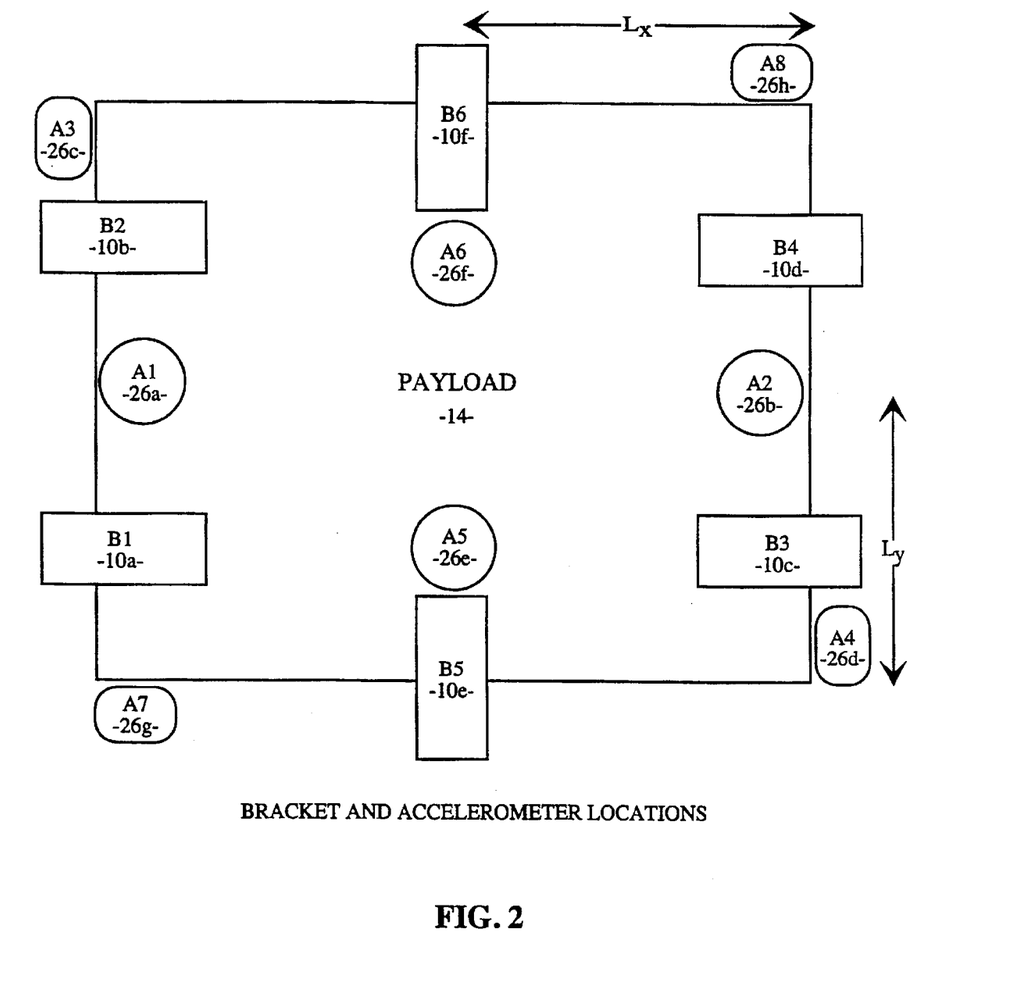
FIG. 2 is a top view of the payload with six "S" brackets and eight accelerometers positioned for isolation control.

Referring to FIGS. 1 and 2, several S-brackets 10a–g can be used together for suspending the sensitive payload 14 from a vibrating platform 12. For example, six brackets 10a–g can be used to support the payload 14. Each bracket 10a–g preferably has a vertical portion 16 and a horizontal portion 18 along with respective PZTs 20a–f. Each bracket 10 provides active control in two directions, for vertical and horizontal motion control. Each vertical pair of PZTs 20a and 20b of brackets 10a–g are connected together to a respective horizontal motion PZT amplifier 22a. When a voltage, positive or negative with respect to the grounded bracket 10, is applied to the vertical PZTs 20a–b, the bracket 10a–g cause a horizontal component motion of the payload 14. Likewise, each set of four horizontal PZTs 20c–f is connected to a respective vertical motion amplifier 22b. When a voltage, positive or negative with respect to the grounded brackets 10, is applied to the horizontal PZTs 20c–f, the brackets 10 cause a vertical component motion of the payload 14. The applied PZT voltage of the amplifiers 22 with respect to the grounded bracket is zero to 150 volts.

Four PZTs of two pairs, 20c–d and 20e–f, are used in the horizontal portion 18 of the bracket 10 instead of a single PZT pair 20a–b as on the vertical portion 16, for accommodating vibration disturbances of larger magnitudes in the vertical direction. The horizontal motion is separated into an X and Y direction whereas the vertical direction is defined as a Z direction orthogonal to the top plane of the payload 14. Accelerometers 26a–i are also bonded to the payload for measuring movement along all three spatial axis X, Y and Z. Accelerometers 26a and 26b are positioned on the X axis center line and accelerometers 26e and 26f are positioned on the Y axis center line of the payload 14 having a length 2Lx and a width 2Ly. The number and placement of the accelerometers may vary in accordance with the invention.

Figure 3:
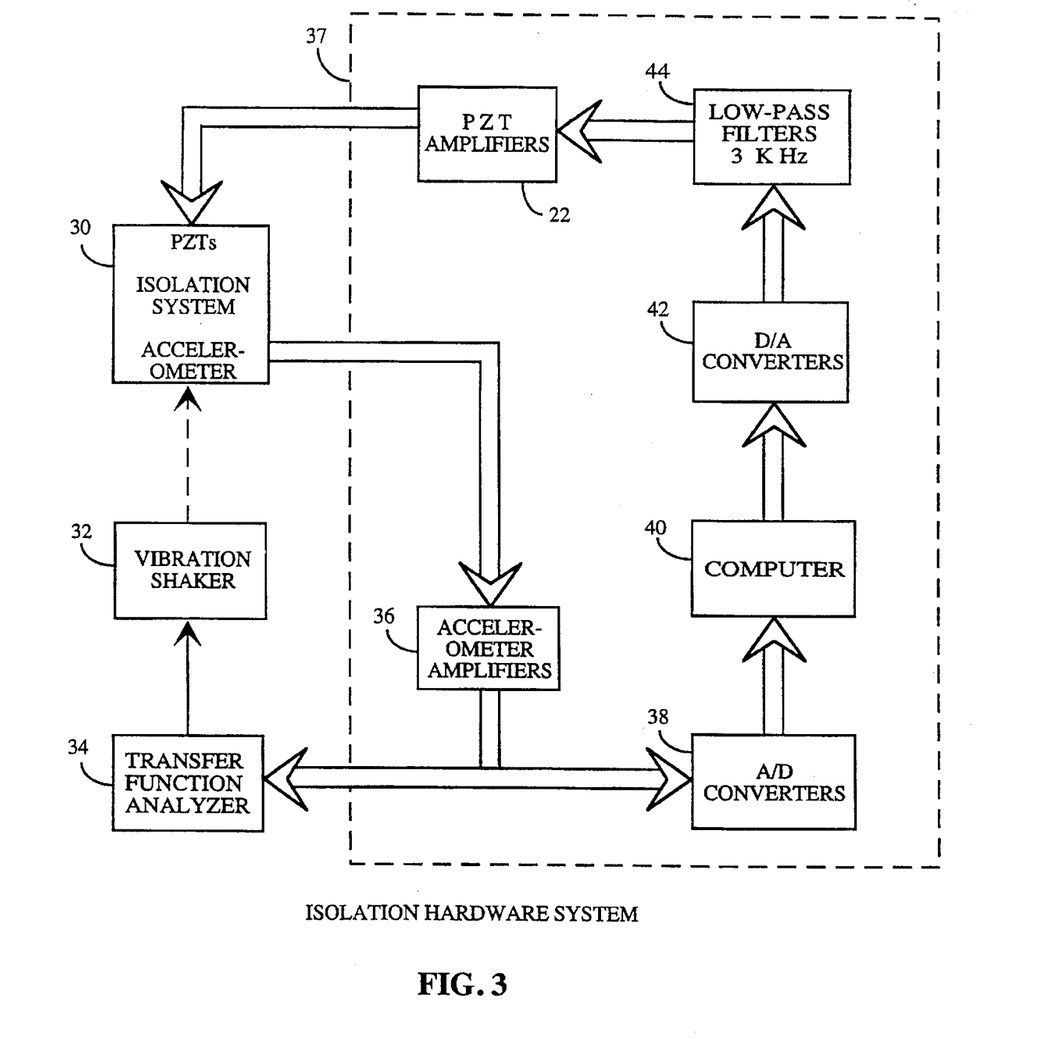
FIG. 3 is a block diagram of a vibration isolation control system.
Figure 4:
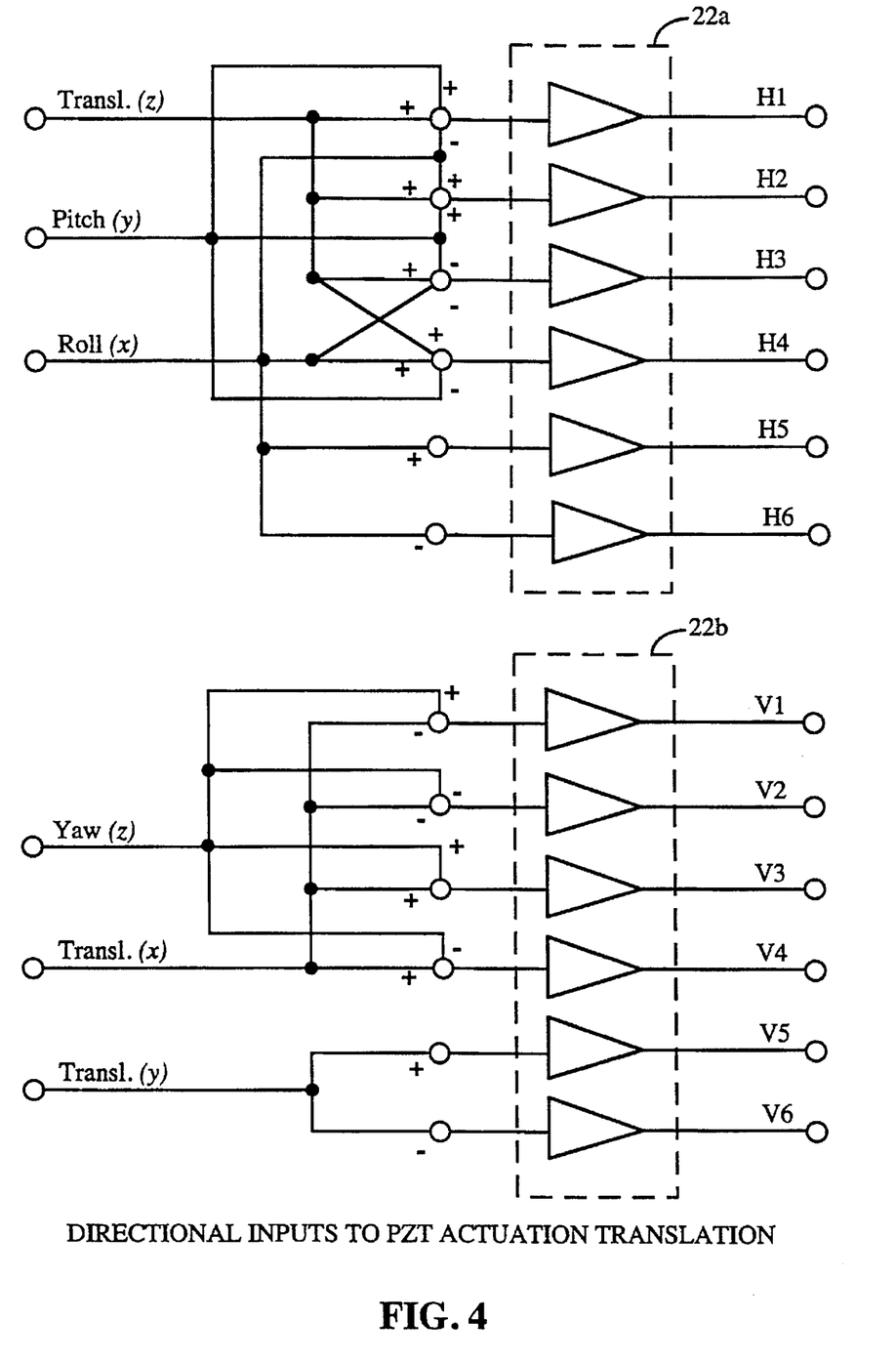
FIG. 4 is a block diagram of PZT amplifiers controlled by X, Y and Z directional motion control signals.

Referring to FIGS. 1, 2, 3 and 4, one aspect of the invention is a vibration isolation system shown in FIG. 3 for attenuating vibration of the payload 14. An isolation system 30 comprises the brackets 10, support 12 and payload 14. An exemplar isolation system 30, the vibrating support 12 may be a thin flexible aluminum plate, not shown, mounted on a frame, not shown, as may be used in a space vehicle. The payload 14 is suspended from the flexible plate through the S-brackets 10, which may be six brackets 10a–g. By way of example, having the payload may have eight accelerometers 26a–h. This exemplar isolation system 30 is capable of providing six degrees of freedom of isolation of the payload 14 from the support 12. As shown in FIG. 4, six degrees of freedom are translated to PZT control signals through amplifiers 22a and 22b, as shown.

The isolation system 30 has several low frequency resonance modes which can be determined by open loop measurement of the transfer function of the isolation system 30 between the PZT inputs and the accelerometer outputs. Typically, the isolation system 30 attenuates the first two large resonances for each degree of freedom in the low frequency band between 1 to 100 hertz. First, open loop transfer functions of the isolation system 30 can be measured using an analyzer 34 which generate a broad band frequency sweep signals for driving the PZTs 20, and measuring sensed motion from the accelerometers 26. Six transfer functions are obtained, one for each of the six degrees of freedom control loops. The measuring device 34 may be computer or analyzer. Preferably, and HP 3562 frequency response analyzer may be used to measure the frequency response. The analyzer 34 generates sinusoidal signals to activate the PZTs 20 and receives accelerometer signals through accelerometer amplifiers 36. The analyzer 34 records gain and phase plots of the transfer function between the PZTs 20 and the accelerometer outputs as amplified by amplifiers 36.

After the six transfer functions have been determined for the isolation system 30, six control functions are synthesized and embedded in a vibration isolation system shown in FIG. 3. The vibration isolation system comprises the isolation system 30 and an isolation control system 37. The isolation control system 37 comprises amplifiers 36, Analog-to-Digital converters 38, a computer 40, Digital-to-Analog converters 42, low pass filters 44 and PZT amplifiers 22. This control system provides operation control to achieve desired attenuation. The accelerometer outputs are communicated by accelerometer amplifiers 36 through A/D converters 38 to the computer 40, e.g. a 486 computer, sampling at a exemplar three kilo hertz sampling rate for sensing instantaneous motion of payload 14. After the computer 40 is programmed with control programs, the computer 40 drive the PZTs 20 based upon accelerometer outputs under closed loop control. During close loop operation, the isolation accelerometer outputs are communicated by accelerometer amplifiers 36 through A/D 38 to the computer 40 which provide control signals through the D/A converters 42 through Low pass filters 44 to PZT amplifiers 22 which drive the PZTs 20 with about three milli amps, thereby closing the loop of the vibration isolation system.

After development of the control function, the vibration isolation system of FIG. 3, along with the analyzer 34 and a shaker 52 provide close loop testing for operational control verification. The shaker 52 may be, for example located below the support 12 and attached to the plate so as to introduce vibrations into the support 12. The shaker 52 can be used to measure the amount of achieved attenuation of vibration signals generated by the analyzer 34 which stimulates the shaker 52 to induce vibrations into the support 12 of the isolation system 30. The shaker 52 may be driven by any noisy source, preferably for example, the broad band analyzer 34, to generate the mechanical disturbances which excite the support 12. The analyzer 34 is then used to sense the motion of the payload 14 as provided by the outputs of the accelerometer amplifiers 36 so as to plot the frequency response of the isolation system 30 under close loop control. The close loop response can then be compared to the open loop frequency response to verify the amount the attenuation achieved.

Various methods may be employed to translate payload motions from the outputs of the accelerometers 26 into X, Y and Z translational motion and yaw, pitch and roll rotational motion. The motion of the payload 14 is sensed by eight accelerometers 26 which are located symmetrically at various parts of the payload 14, for example as shown in FIG. 2. The accelerometers 26 are preferably positioned to measure linear acceleration along and angular acceleration about all three spatial axes X, Y and Z. Using preferably eight accelerometers 26a–h designated A1, A2, A3, A4, A5, A6, A7 and A8, respectively, six degrees of freedom can be determined for operational use including: pitch motion of angular acceleration about the Y axis equal to (A1–A2)/Lx; roll motion angular acceleration about the X axis equal to (A5–A6)/Ly; Yaw motion of angular acceleration about the Z axis equal to (A3–A4)/2Ly +(A7+A8)/2Lx; Y motion of linear acceleration along the Y axis equal to (A8–A7)/2; X motion of linear acceleration along the X axis equal to (A3–A4)/2; and Z motion of linear acceleration along the Z axis equal to (A1+A2+A5+A6)/4.

The accelerometer signals are amplified by amplifiers 36 to higher voltages, e.g. five volts zero to peak, in order to be sensed by the A/D converters 38. The computer 40 reads and processes the accelerometer signals, and implements vibration control laws. The computer 40 uses the X, Y and Z translational motion and yaw, pitch and roll rotational motion to generate PZT drive signals as shown by way of schematic interconnections representation as in FIG. 4 which also depicts the amplifiers 22. The computer 40 provides horizontal PZT drive signals H1-8 for vertical motion control and provides vertical PZT drive signal V1-8 for horizontal motion control. The PZT drive signal H1-8 and V1-8 are converted into analog signals by the D/A converter 42. The D/A converter signals are filtered by the low pass filters 44 to attenuate quantization noise. The PZT drive signals H1-8 and V1-8 are then amplified by PZT amplifiers 22 to higher voltages, e.g. 130 volts, for driving the PZTs 20. The PZT amplifiers 22 activate the horizontal and vertical PZT pairs 20a–b, 20c–d, 20e–f of each bracket, counteracting the effect of vibration and disturbances of the payload 14.

Figure 5:
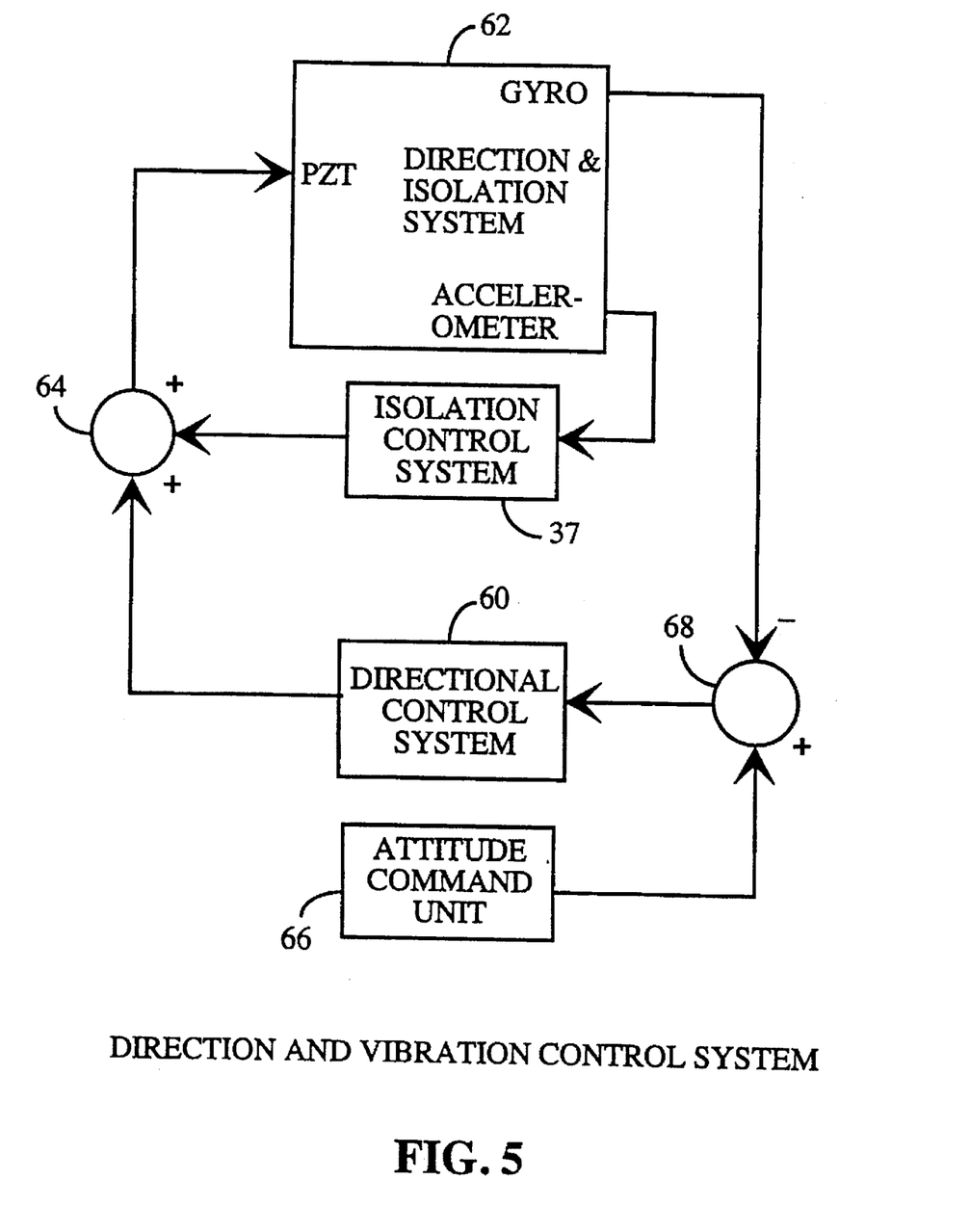
FIG. 5 is a block diagram of an integrated direction and vibration control system.

Referring to FIGS. 1, 2 and 5, the isolation control system 37 and a direction control system 60 drive the PZTs of a direction and isolation system 62 comprising a payload 14, a plurality of brackets 16 having PZTs 20, accelerometers 26, and a preferably two axes gyro, not shown, for generating pitch and roll attitude signals. The isolation control system 37 and the directional control system 60 have PZT control signals which are summed by a summer 64 which provide superimposed PZT drive signals.

The same brackets 16 are be used for directional attitude control of the payload relative to the support under active control in two directions. The directional control relies upon the placement of a plurality of brackets, which may be for example, S-brackets. The active control extends over all three spatial axis. In the preferred form, only the horizontal PZTs, for example, PZTs 20c–f are needed for directional control by varying the vertical displacement at a plurality of point around the payload 14 corresponding to the placement of the brackets 10.

The gyro is securely mounted to the payload 14 for providing attitude directional signals. The gyro directional attitude pitch and roll signals are subtracted from attitude command pitch and roll signals generated by an attitude command 66 unit by a summer 68 providing differential directional pitch and roll signals. The summer 68 provides the differential pitch and roll signal to the directional control system 60 which translates the differential pitch and roll signals preferably as shown in FIG. 4 horizontal PZT drive signals H1 through H6, which are superimposed with the H1 through H6 vibration isolation signals provided by the isolation control system 37. In a preferred form, a single computer may provide both vibration isolation control and directional control with the directional pitch and roll signal being respectively superimposed with the vibration isolation pitch and roll signals. The superimposed directional pitch and roll signal drive the gyro the attitude corresponding to the attitude command signals generated by the attitude command unit.

The inner accelerometer vibration isolation feedback loop operates at high frequencies typically between 5 and 100 Hz, while the outer gyro directional feedback loop operates at low frequencies between 0 and 5 Hz. The accelerometers provide three dimensional motion signals of high frequencies well suited for active vibration isolation while the gyros provide three dimensional directional signals of low frequencies well suited for active directional control. The preferred bracket is an S-bracket for H-Infinity development for isolation control. However, in the event that a large angle directional control system is required, a preferred "accordion" bracket could be used. The accordion bracket has a plurality of generally positioned horizontally strips which expand towards the vertical position. The accordion bracket provide greater attitude angles and does not have vertical PZTs.

The directional control system may further include compensation component for close loop stability, as is well understood by those skill in the art. The directional and vibration isolation system is well suited for mirror control systems which controls the direction of a reflected beam of light while simultaneously isolating it form the local vibration of a motor.

Figure 6A:
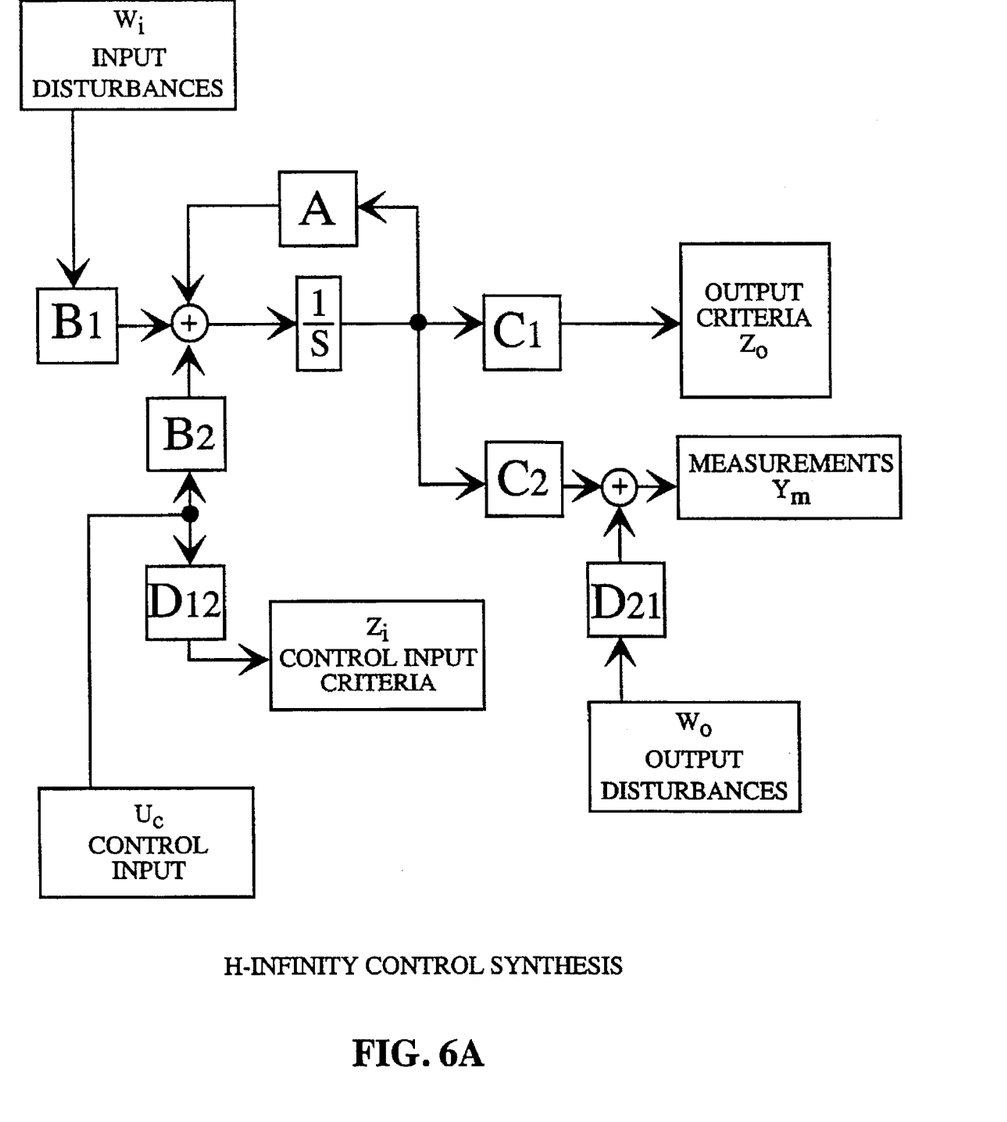
FIG. 6a is a block diagram representing H-Infinity control synthesis dynamics.
Figure 6B:
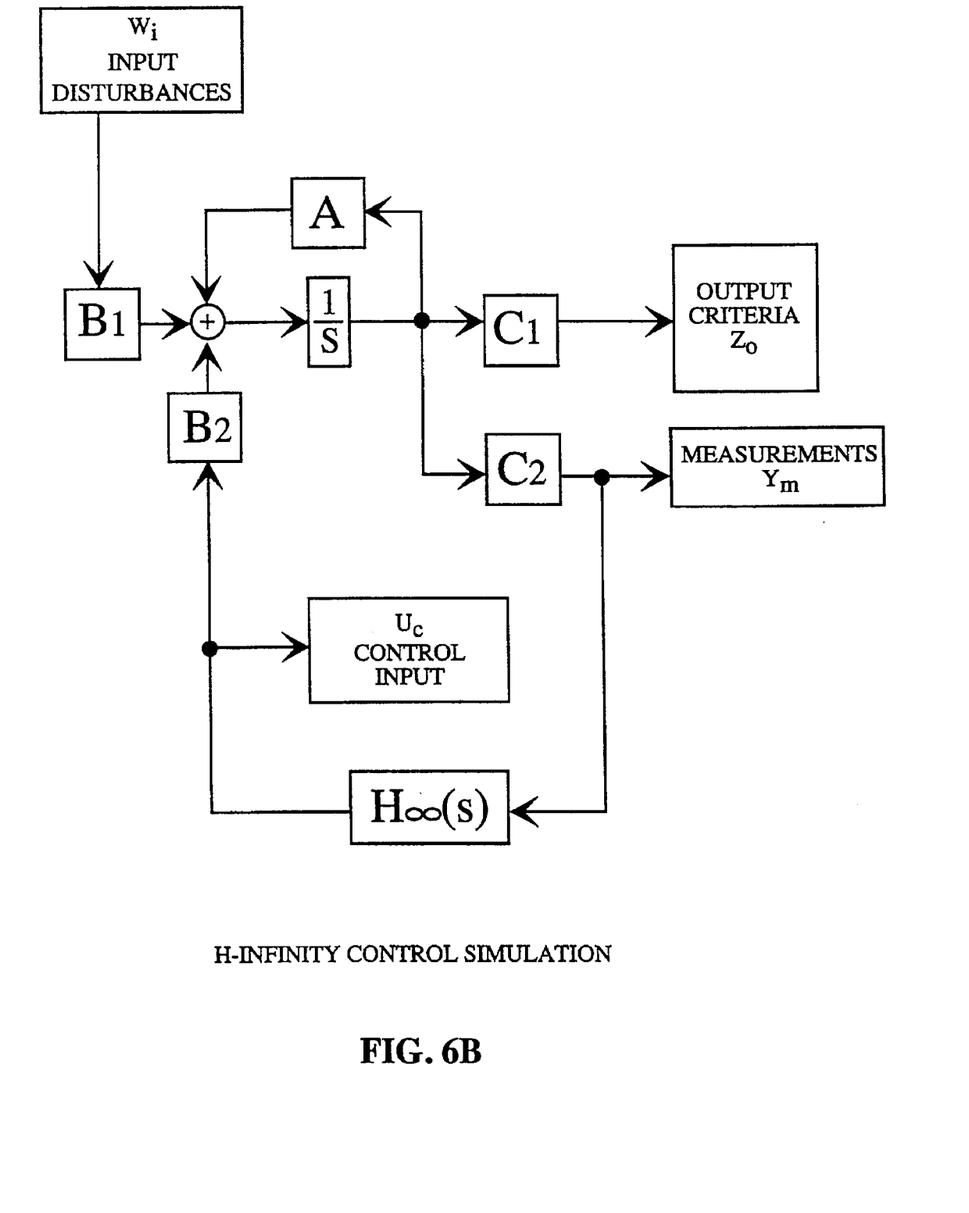
FIG. 6b is a block diagram representing H-Infinity control simulation model.
Figure 6C:
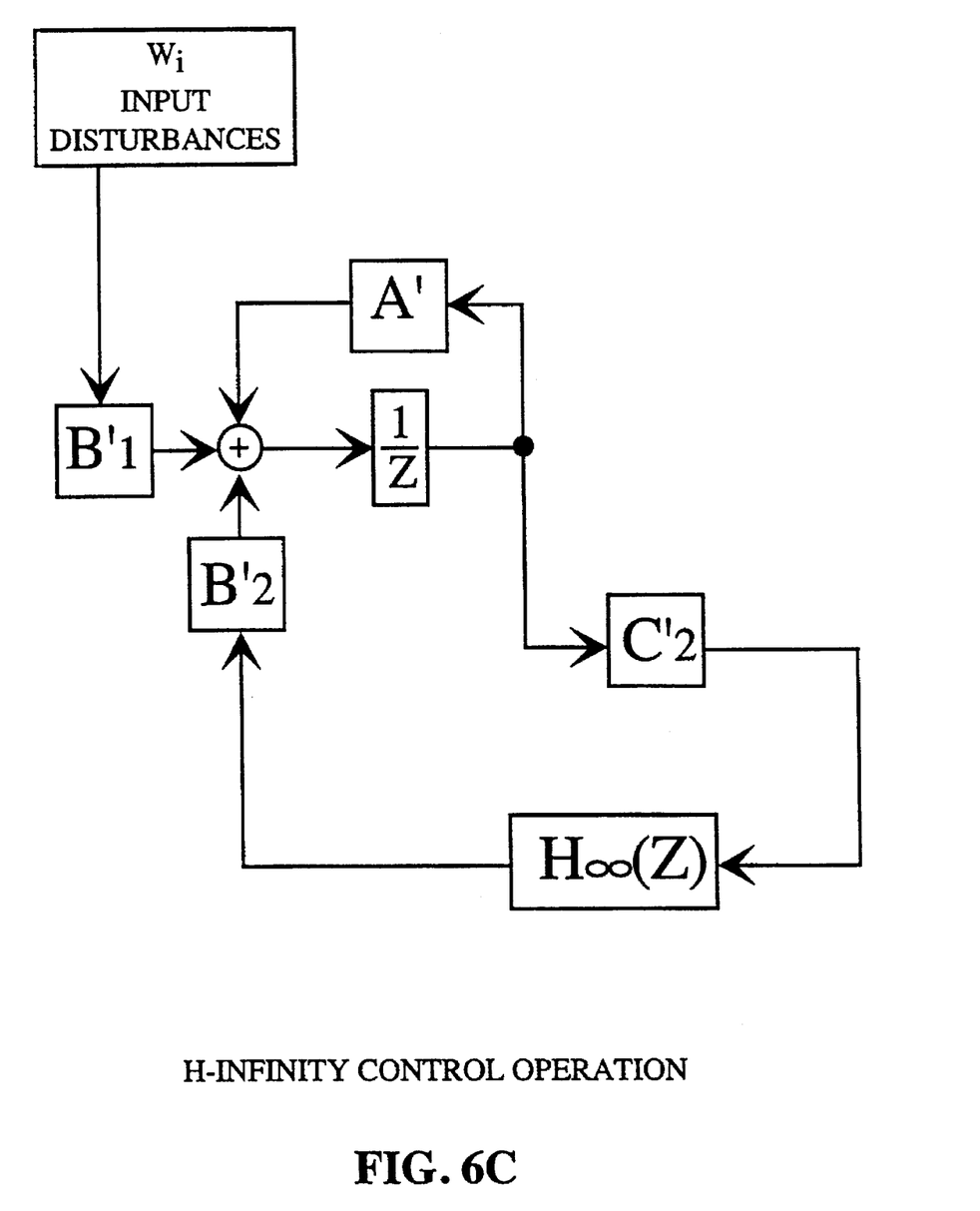
FIG. 6c is a block diagram representing H-Infinity control operation plant dynamics.

Referring to FIGS. 6a, 6b and 6c, the H-Infinity method is used for designing control that minimizes the motion of the payload 14 due to the vibration disturbances coming from the support 12. The design philosophy appears to contradict the conventional robust control approach, where the software controller embedded in the computer 40 is designed with a sufficient amount of built-in robustness for handling large uncertainties in the plant dynamics of the isolation system 30 at the expense of performance. This approach may be necessary for a flight vehicle or a space structure where the structural modes cannot be accurately predicted before flight. In these situations the controller should be able to handle variations in configurations. The electro-mechanical isolation 30 system can be accurately measured after construction. This allows for trade-off between performance against robustness in plant uncertainties, by relying heavily on the accuracy of the plant model for achieving significantly better isolation performance. This approach is acceptable since the modes of the structure are not expected to change appreciably after construction. The amount of vibration isolation performance that can be achieved depends upon accurate plant modeling that can be obtained from frequency response measurements.

Referring to FIGS. 3, 6a, 6b and 6c, the H-Infinity control design approach is based on modal decoupling, that is, decoupling the isolation system 30 and the control system 37 into separate modes comprising six separate single input single output loops, one for each of the six payload degrees of freedom, with preferably little or no coupling between loops. Decoupling the plant dynamic into decoupled modes allows the design and implementation of each control loop separately, one loop at a time, which reduces control system complexity.

In one form of the invention, three out of the six control loops may be implemented, with each controller attenuating the first two modes per loop for a total of six resonant frequency modes attenuated. Four accelerometers A1, A2, A5 and A6, designated 26a, 26b, 26e and 26f are used to sense three degrees of freedom, and only the horizontal PZTs 20c–f are used on only four bracket 10a, 10b, 10c and 10d, that is (B1, B2, B3 and B4). In FIG. 4, the vertical, pitch and roll degrees of freedom are shown translated to the four horizontal PZT drive signals H1-4. The vertical Z motion is sensed by averaging the signals from the four accelerometers $A1+A2+A5+A6/4$, the pitch motion is sensed by the difference of the two accelerometers A1 and A2 that is $(A1-A2)/Lx$, and the roll motion is sensed by the difference of accelerometer A5 minus accelerometer A6, that is $(A5-A6)/Ly$. The three controllable degrees of freedom are the vertical translation along the Z axis, roll rotation about the horizontal X axis and Pitch rotation about the horizontal Y axis. These degrees of freedom are more critical for vibration control when vibration disturbances do not excite along the horizontal plane as much as the vertical axis. Only four out of the eight accelerometers 26a, 26b, 26e and 26f, (that is A1, A2, A5 and A6) are used to measure the vertical motion of the payload, and only four out of six S-brackets are used for control, and only the horizontal segments 18 of brackets 10a, 10b, 10c and 10d, (that is B1, B2, B3, and B4) are activated for applying vertical forces on the payload 14. The vertical portions 16 need not be activated due to the small disturbance magnitudes exciting the horizontal directions. The control system 37 is decoupled into three single input single output loops, the pitch loop, the vertical loop, and the roll loop. The PZT drive signals H1-H6 applied to the PZT actuators 20c–f include superimposed contributions from each of the three controller outputs, pitch, roll and Z motion as shown by interconnection in FIG. 4 for the vertical motion amplifiers 22a.

The three pitch, roll and Z motion control loops correspond to the vertical motion, pitch rotation and roll rotation. The vertical motion that uses the average of the four accelerometers sensed as one signal feeding into the vertical-loop controller implemented in the computer 40. The computer 40 drives all four actuator brackets 10a–d (B1–B4) together. The pitch rotation is sensed by the difference of the two accelerometers (A1–A2) as one measurement. This signal is compensated by the pitch controller, and the controller output drives the four S-brackets 10 as follows: B1 and B2 are activated by a voltage equal to the controller output, and B3 and B4 are activated by an equal and opposite to B1 and B2 voltage. Similarly, the roll motion is sensed by the difference of the accelerometers 26e and 26f. This signal is compensated by the roll controller driving the four actuators as follows: B2 and B4 are activated together by the voltage from the output of the roll controller, and B1 and B3 are activated by an equal and opposite voltage.

The development of the H-Infinity controller relies upon an understanding of the plant dynamics. The development of the control system preferably involves: i) measuring the transfer function of the isolation system between the PZTs and the accelerometers using shaker inputs, ii) curve fitting the transfer function; iii) translating the transfer function into a state space representation; iv) specifying attenuation modes design criteria; generation of the H-Infinity control through programmed synthesis; v) truncating-residualizing the H-Infinity control to minimize computational requirements; vi) simulating the H-Infinity Control for determining input, output and design criteria are within design goals; vii) discretizing the H-Infinity controller; viii) coding the H-Infinity control into program language; ix) testing under closed loop conditions using a shaker input; and x) operational use.

The control system design requires advance knowledge of the resonant frequencies of the isolation system 30 which may vary from system to system. The transfer function is measured by applying frequency varying sinusoidal voltages to the PZTs over a frequency bandwidth providing a frequency response plot curve. This curve is fitted to a mathematical transfer function. Many programs are available to support the development of the active H-Infinity control. A curve fitting program is provided by NASA, TM-X-3286. The transfer function is then converted by computer program into a state-space representation for H-Infinity synthesis. A MATLAB program provided by The Math Works, Inc. Natick Mass. may be used to convert the transfer function. The state-space conversion computer program generates state space A, B1, B2 and C2 matrices shown in FIG. 6a.

In FIG. 6a and 6b, state-space matrices A, B1, B2, C1, C2, D12 and D21 are state space matrices, Wi, Wo, Zi, Zo, Ym and Uc are inputs and outputs of the represented plant dynamics of the isolation system 30, 1/S is the integration function, H(s) is the H-Infinity controller. FIG. 6c represents the plant dynamics during operation use after discretization. Typically, matrix B1 is equal to matrix B2. Matrices D12, D21 and C1 function as design performance criteria which are specified predetermined values. Selected resonant frequency modes for controlled attenuation can be automatically selected by scanning the frequency spectrum and selecting high resonance frequency of high amplitude, e.g. greater than ten db. The selection of the first ones, e.g. the first three resonant frequencies above one hertz and lower than 100 hertz can be selected.

The H(s) controller is then synthesized using the A, B1, B2, C1, C2, D12 and D21 inputs. The H-Infinity synthesis program solves the state space optimization equation. The H-Infinity synthesis program synthesizes an H-Infinity H(s) controller that closes the loop between the Ym output and the Uc input. The H(s) controller minimizes the ratio between the disturbance input and criteria output (Zo/Wi) transfer function which is designed to attenuate resonant modes. During synthesization, Zi is monitored to confine the input range. Wo is monitored to desensitize the control system 37 for robust operation. By injecting noise and verification of control, the control system 37 functions to control potential uncertainties. The larger the noise, the more uncertainty than can be controlled. Larger D21 provides a more robust system. Robustness is the ability of the control system 37 to maintain performance with the presence of variations of system parameters such as resonances. Introducing noise disturbances simulation variations of system parameters. There is a trade off between performance and stability. Increasing performance may cause instability. D21 is set at a level of adequate performance with stable operation. Furthermore, the H-Infinity synthesis program execution will generate the H(s) controller which may have instability at high frequency. Loop shaping filters are used to reduce the instability by attenuating high and low frequencies such as those above 100 Hz and below two hertz. Thus, the H(s) controller preferably only operates at low frequency, for example, between 3 and 100 hertz.

After the state space H-Infinity controller has been generated in state space representation, the H(s) controller is reduced by truncation and residualization as part of model reduction of H(s) controller having Ac Bc Cc and Dc state space H-Infinity control matrices. The truncation eliminates high frequency resonances and therefore it reduces the size of the control function and thereby reduces the amount of computational requirements. The MATLAB program is also suited for such reduction. The purpose of the H(s) controller reduction is to reduce required computation processing at time of simulation, testing and operation use. After reduced state-space H(s) controller generation, an H-Infinity simulation program, for example using MATLAB to close the control loop, is executed with Uc monitored for suitable input ranges of PZT control signals, and with Ym monitored for suitable input ranges of accelerometer output, as shown by plant dynamic representation in FIG. 5b. The simulation generates Wi and monitors Zo to determine the amount of attenuation. If Uc, Ym and Zo are outside design ranges, then D12, D21 and C1 may be readjusted and the H(s) controller re-synthesized and simulated. C1 is an amplification scaler matrix which specifies selected modes. D12 scaler modifies the input disturbance control to the amount of permissible input signal. D21 scaler modifies the amount of noise disturbances injected at the output and reflects the reliability of system in terms of the amount of parameter uncertainty that the control system will be able to accept at a give performance level.

After a successful simulation, the H(s) controller is discretized using for example the MATLAB program to generate a discrete state space H(z) controller representation which can then be coded into a computer program and executed for testing and operational use as represented by plant dynamics of FIG. 6c. The system operates on a fixed internal sampling rate which is limited by the speed of the computer 40. Higher the sampling rate the faster the computer 40 can change its output drive signals to the PZTs for improved control. The discretization converts the continuous H(s) controller representation into a discrete H(z) representation corresponding to the fixed sampling rate of the embedded controller.

The H-Infinity method is more complicated by the use of multiple variable design approach. The preferred method employs single variable techniques for each degree of freedom independent of each other. Thus, for six degrees of freedom, there is a pitch controller, roll controller, yaw controller, X controller, Y controller and a Z controller, each acting independent of the other five. Thus, the entire method of developing a control function is processed and solved for each degree of freedom. Then, the processes are executed simultaneously. For multi-variable approaches, computer program translation of the transfer functions to state space representation, the program will not generate a minimum realization with redundant states not well suited for H-Infinity control generation. Curve fitting, conversion to state space representation, H(s) synthesis is simplified using the single variable approach. The preferred method does not produce cross-coupling of modes between multiple degrees of freedom, yet the single variable method still obtains significant attenuation.

The H-Infinity method was used for designing the three single input single output controllers attempting to minimize the infinity norm of the transfer path between the disturbance and the accelerometer outputs. This method was selected because it is simple to apply. It is also easy to modify the design when a small change occurs in the model. It requires, however, a design model consisting of the dominant plant dynamics of the isolation system 30. The three single input single output models were identified by decoupling this multiple variable vibration isolation system into three degrees of freedom: the vertical translation, and the pitch and roll rotations. The frequency responses of the plant dynamics of the three single input single output control loops are measured. The vertical plant dynamics was measure by exciting the four horizontal actuators simultaneously using a frequency changing sinusoid generated by the HP analyzer, and reading the sum of the four accelerometer responses. The pitch loop characteristic motion was estimated by activating brackets 10a and 10b (B1 and B2) together with a sinusoid from the HP analyzer. An equal and opposite signal was applied to bracket 10c and 10d (B3 and B4) equal to the difference of the two accelerometer 26a minus accelerometer 26b, (A1–A2). Similarly, the roll plant was estimated by activating 10b and 10d, (B2 and B4) together with the same sinusoid signal, and 10a and 10c (B1 and B3) together with the inverted signal equal to the difference of the accelerometers 26e and 26f, (A5–A6).

For example, three eighth order transfer functions may be estimated from the frequency response analysis. But, only the first two modes per loop were targeted for control. Higher frequency modes do not require attenuation because the amplitudes associated with high frequency modes are extremely small, causing negligible position errors. The first mode at 9 Hz, is a rotational resonance about the y axis (pitch). There is also a dominant pitch mode at 21 Hz. The second system mode is a vertical translation resonance at 10 Hz. This mode causes the uncontrolled payload to oscillate in the vertical direction. There is also a strong second resonance in the vertical direction at 33 Hz. The third system mode, at 10 Hz, is a resonance about the x axis (roll). There is also another dominant rotational (roll axis) resonance at 19 Hz. This approach essentially separates the modes into three single input single output loops, with two dominant modes per loop to be attenuated. It also simplifies the control design task since each one of the three controllers focuses on specific modes.

The three estimated transfer functions are combined with loop-shaping filters, converted into the standard H-Infinity synthesis model form and applied to the H-Infinity algorithm. The advantage of decoupling the plant is that the multiple variable system becomes diagonally dominant, but is not completely diagonal due to lack of symmetry since the S-brackets are not able to generate exactly equal amounts of force due to uneven bonding of some of the PZTs, and other factors. The control design approach for the three single input single output loops is very similar, and only one loop is discussed.

The H-Infinity controller provide one second order resonance for each selected resonance mode. In the closed-loop sense, the controller behaves like anti-resonances, counteracting the effect of mechanical resonances at the system's output. This design requires knowledge of the plant dynamics. The H-Infinity optimization algorithm was applied. The H-Infinity controller is based upon the H-Infinity synthesis model which comprises the plant dynamics, control inputs and disturbance inputs, measurements, and criteria outputs. A typical synthesis model is shown in FIG. 6a. The model comprises plant dynamics specified in terms of control inputs and output measurements, but it includes also additional inputs and output vectors representing disturbance inputs and output criteria to be minimized. The disturbances describe how the noise corrupts the plant both at the input and at the sensors. The criterion vector comprises a combination of variables including state variables and control inputs which must be minimized by an H-Infinity algorithm in the presence of disturbances. The design goal is to close the loop between the measurements Ym and the control inputs Uc via a dynamic controller so that the infinity norm of the sensitivity transfer function between the disturbances (W) and the output criterion (Z) is minimized in the closed-loop. In the isolation system 30, for example, this sensitivity minimization is accomplished by using the PZTs 20 on the S-brackets 10 to actively damp out the effect of support vibrations on the payload 14. This sensitivity minimization occurs only in the plant modes which have been included in the synthesis model. To avoid spill-over effect, loop shaping techniques filter out the high frequency modes in the feedback loop. The H-Infinity design process includes applying the H-Infinity method, a reduced plant model is required consisting mainly of the modes to be actively controlled. For the pitch loop, for example, the design plant G(s) may have only the first three pitch resonant frequency modes. Although attenuation is intended only for the first two modes, the third mode is also included in the synthesis model because it is near the cross-over frequency. The H-Infinity controller guarantees stabilization of all modes that have been included in the synthesis model, otherwise, if another mode is not included, it may become unstable during operation use.

Figure 7A:
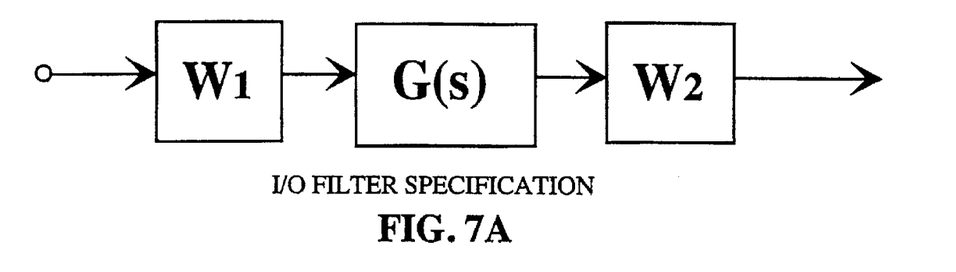
FIG. 7a is a block diagram of I/O filtering specification of additional control performance requirements.
Figure 7B:
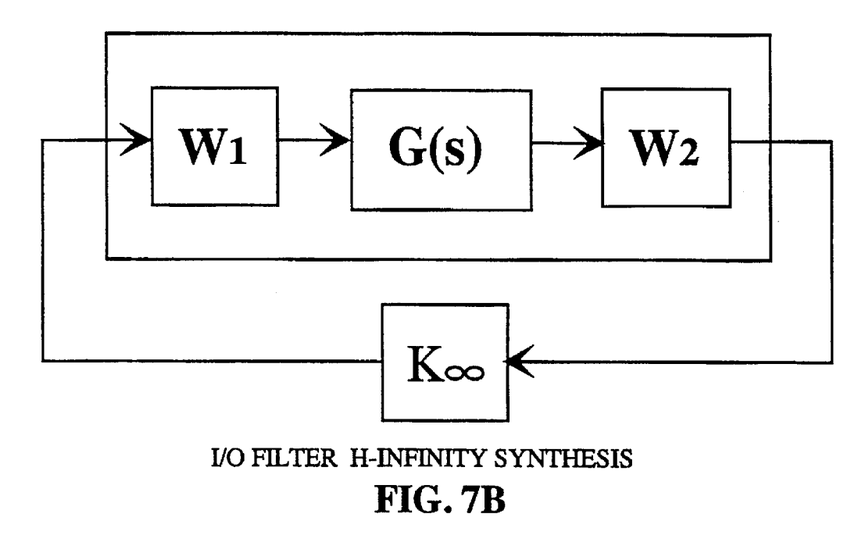
FIG. 7b is a block diagram of I/O filtering within an H-Infinity control model.
Figure 7C:
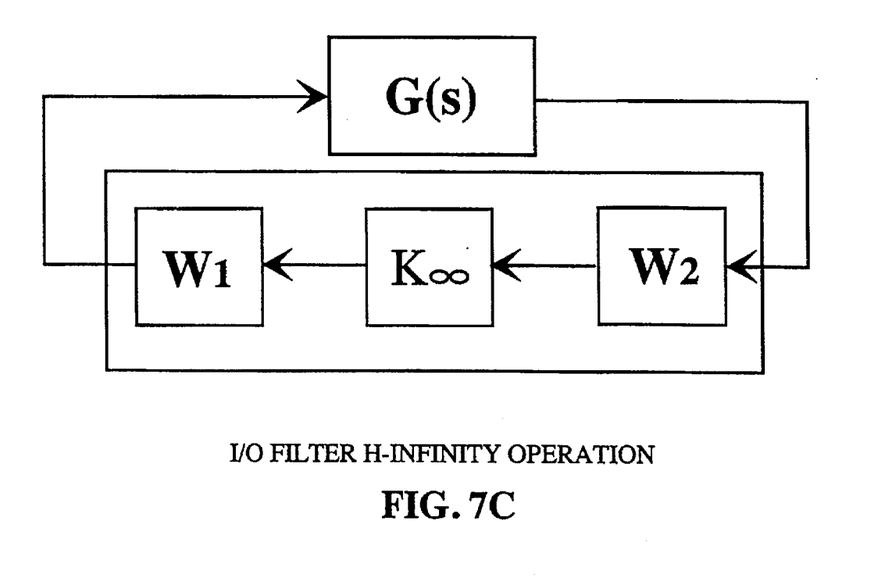
FIG. 7c is a block diagram of I/O filtering incorporated within the H-Infinity control.

Referring to FIGS. 7a, 7b and 7c, loop shaping of the H-Infinity controller function is desirable to reduce potential instability of unattenuated resonant modes near the frequencies of the selected resonant modes. If an uncontrolled resonant mode is in close frequency proximity to the low frequency bandwidth, then instability may occur. To attenuate these uncontrolled resonances, loop filtering may be used. Accelerometers 26 have unreliable bias and may be saturated if driven hard at low frequency. Preferably, loop filters are at two times the highest controlled resonant frequency mode. For example, the loop filters may attenuate for frequencies less than 2 hertz or greater than 100 hertz.

Loop shaping is used to refine the control system particularly at high frequencies greater than 100 hertz. There are many resonances at higher frequencies which may not be attenuated by active PZT control. These high frequency resonances are significant. The controller may destabilize some of the high frequency resonances when actively controlling lower frequency resonances. The controller should have low gain at higher frequencies, otherwise destabilization may occur at high frequency resonances. Thus, refinement of the low frequency control remove the affect of low frequency controls upon the high frequency resonances. One way to introduce the refinement is to introduce a low pass filter W2(s) at the measurements output of the synthesis model.

Another potential problem is that accelerometer measurements are unreliable at very low frequencies below one hertz. The accelerometer output has a small dc bias. If the controller has high gain at low frequencies, such as a typical integrating controller, the feedback signal from the accelerometers 26 will saturate the PZT amplifiers 22. One way of maintaining the controller magnitude relatively small at low frequencies is to introduce a high pass filter W1(s) with a cut-off relatively small at low frequency around two Hertz at the input of the synthesis model, at the control input Uc. Thus, the synthesis model G(s) of FIG. 7a has input filter W1(s). The filter W2(s) has a roll off to provide attenuation at high frequencies. The filters W1 and W2 can be incorporated by the inclusion of two additional transfer functions into the synthesis model as shown in FIG. 7b. The augmented synthesis model can be restated in state space form identical to the synthesis model generated as in FIG. 6b, but the matrices A, B2 and C2 will contain additional parameters from W1 and W2 filters. FIG. 7b shows the augmented synthesis model consisting of W1, G(s) and W2 with an H-Infinity controller looping around it. The H-Infinity controller was derived based on the augmented synthesis model. FIG. 7c shows the implementation of the controller for the augmented model. The transfer functions W1(s) and W2(s) are not part of the dynamic hardware. W1(s) and W2(s) are implemented as part of the controller. The augmented controller consisting of W1, W2 and the H-Infinity controller are sown as one block closing the loop around the original system. The augmented controller is reduced in size using standard model reduction techniques such as those provided with MATLAB.

Loop shaping before H-Infinity synthesis is used to specify closed-loop objectives in terms of requirements on the open-loop characteristics. Simplistically, by selecting a controller with a high open-loop gain at the mode frequencies that are to be controlled and a low gain at high frequencies, good closed-loop performance and robustness, that is, the attenuation of law frequency modes can be achieved against uncertain high frequency modes. It is possible to shape the open-loop characteristics of the nominal design model G(s) via compensators so that the open loop system exhibits the desired properties, FIG. 7a. The shaping filters Wi(s) are combined in series with the reduced order plant G(s) to form the augmented synthesis model, G(s)=W1(s)G(s)W2(s) as shown in FIG. 7b. The H-Infinity algorithm is then applied to the augmented plant G(s) to obtain an H-Infinity controller K(s) that stabilizes it, and meets certain design requirements reflected in the shaping filters. The final controller is constructed by combining the controller K(s) with the shaping filters W1(s) and W2(s) as shown in FIG. 7c.

The shaping filters W1(s) and W2(s) reflect the desired performance and robustness requirements of the closed loop system in the synthesis model. The attenuation modes are generally between five and one hundred hertz. The main requirement for the pitch controller, for example, is to attenuate the response of the first two pitch modes, e.g. at nine and twenty-one hertz. Higher frequency modes do not have to be controlled but they must be protected from becoming unstable. This requirement is reflected in the synthesis model by placing a third order roll-off shaping filter W2(s) with a cut-off frequency a little higher than the second mode. A low frequency requirement is also needed, because the resulting control system cannot have an integrating action. In fact, the controller gain must be small at low frequencies because the accelerometer signal may have a small dc bias that would saturate the controller if an integrator was present. The controller gain must therefore be as small as possible at dc. This requirement is reflected in the design model by the introduction of an additional shaping filter, a high pass filter W1(s), for attenuating the controller response at low frequency and preventing the controller to respond at dc. The high pass shaping filter transfer function is $W1(s)=s(s+10)$. This type of shaping function de-emphasizes also the accelerometer signal below 1 Hz, which is unreliable. The shaping filters are now combined with the design plant G(s) to form the augmented synthesis plant W2(s)G(s)W1(s). The H-Infinity synthesis algorithm is applied on the augmented shaped plant W2(s)G(s)W1(s) to obtain a controller K(s) for W2(s)G(s)W1(s), as in FIG. 7b. The shaping filters are then combined with K(s) to form an augmented controller for the original plant G(s), FIG. 7c. The augmented controller for the pitch-loop system was sixteenth order. It was reduced in size to a tenth order by the Internal Balancing Model Reduction method available, for example, through MATLAB. A similar design process was repeated for the other two loops, the vertical translation, and the roll rotation about the X axis.

Open loop and closed loop frequency response plots between the shaker 52 and the accelerometers 26 may be measured for comparison. The vertical modes are typically at 9 and 33 hertz, and the pitch and roll modes are about twenty Hertz. External disturbances from the shaker are attenuated during close loop control. The closed-loop versus open-loop system improvement in attenuation is almost twenty db. Although the three loop controller is capable of simultaneously attenuating six modes, not all of the modes can be excited sufficiently from a single shaker position, and therefore, the shaker is moved to different points on the plate of the support to measure several transfer functions to verify mode attenuation.

For terrestrial applications under gravity forces, the size of the brackets have to be designed according to the weight of the payload in order to be able to withstand gravity. If the weight of the payload relative to the bracket is large, causing the brackets to sag under gravity forces, a solution to this problem is to use a soft spring attached to the center of the payload off-loading the weight while still using the active brackets on the sides for vibration control. In space, gravity may not be significant.

Active PZT bracket vibration control systems can provide excellent isolation properties. There are many vibration control applications and variety of bracket designs that can be used depending on the application. For example, four accordion shaped brackets could provide larger deflections for improved active isolation and attitude control. This type of system with four of these brackets can be used for two degrees of freedom, azimuth and elevation, control of an optical instrument mounted on a vibrating base or on a moving vehicle, for improved stabilizing a line of sight as well as vibration control. A two degrees of freedom, azimuth and elevation, controller can isolate the payload from the supporting vehicle disturbances and provide attitude control. This system may have on board inertial measuring devices, such as gyros, as well as a digital control system.

The type and number of brackets, the number of accelerometers, number of gyros, number of PZTs, number of attenuated modes, may be varied for system improvements and convenience. Further, the brackets may be of different construction, such as accordion zig-zag brackets may also be used within the scope of the present invention. While those skilled in the are may make improvements and modifications the preferred form of the invention, those improvements and modification may nonetheless fall within the spirit and scope of the following claims.

I claim:

1. A bracket for isolating a payload from vibrations of a support, said bracket receiving electrical control signals for attenuating said vibrations through said bracket, said bracket comprising,     a first end for bonding to said payload,     a second end for bonding to said support,     a strip portion between said first end and said second end, and     piezoelectric actuator means receiving said electrical control signals and bonded to said strip portion for contracting or expanding said strip portion, said contracting or expanding attenuating said vibrations through said bracket.

2. The bracket of claim 1 wherein said first end is a first horizontal portion bonded to said payload, said second end is a second horizontal portion bonded to said support, said strip portion has a first strip vertical portion connected to said first end, a second strip vertical portion connected to said second end and a strip horizontal portion connected between said first and second strip vertical portions, and said actuator means comprises a first actuator means bonded to said first strip vertical portion and a second actuator means bonded to said strip horizontal portion.

3. The bracket of claim 2 wherein said actuator means comprises a front vertical actuator bonded to a front side of said first strip vertical portion, a back vertical actuator bonded to a back side of said first strip vertical portion of said strip portion, said front and back actuators driven equally but oppositely by said control signal for horizontal motion of said payload, a first front horizontal actuator bonded to a front side of said strip horizontal portion, a second front horizontal actuator bonded said front side of said strip horizontal portion, a first back horizontal actuator bonded to a back side of said strip horizontal portion, and a second back horizontal actuator bonded to said back side of said strip horizontal portion, said first and second front actuators and said first and second back actuators driven equally but oppositely by said control signals for vertical motion of said payload.

4. The bracket of claim 1 wherein said bracket is made of aluminum.

5. A bracket for positioning a payload relative a support, said bracket receiving electrical control signals for repositioning said payload relative to said support, said bracket comprising, a first end bonded to said payload, a second end for bonding to said support, a strip portion between said first end and said second end, and piezoelectric actuator means receiving said electrical control signals and bonded to said strip portion for contracting or expanding said strip portion, said contracting or expanding repositioning said payload relative said support.

6. The bracket of claim 5 wherein said first end is a first horizontal portion bonded to said payload, said second end is a second horizontal portion bonded to said support, said strip portion has a first strip vertical portion connected to said first end, a second strip vertical portion connected to said second end and a strip horizontal portion connected between said first and second strip vertical portions, and said actuator means comprises a horizontal actuator bonded to said strip horizontal portion.

7. The bracket of claim 5 wherein said strip portion has a horizontal portion, and said actuator means comprises a horizontal actuator bonded to said strip horizontal portion for vertical repositioning of said payload relative to said support.

8. The bracket of claim 5 wherein said strip portion has a strip vertical portion and a strip horizontal portion, and said actuator means comprises a front horizontal actuator bonded to a front side of said strip horizontal portion, and a back horizontal actuator bonded to a back side of said strip horizontal portion, said front and back actuators driven equally but oppositely by said control signals for repositioning said payload relative to said support.

* * * * *